Feb. 4, 1930.  W. E. MILEY  1,745,436
EXCAVATING DIPPER
Filed Feb. 21, 1927  4 Sheets-Sheet 1
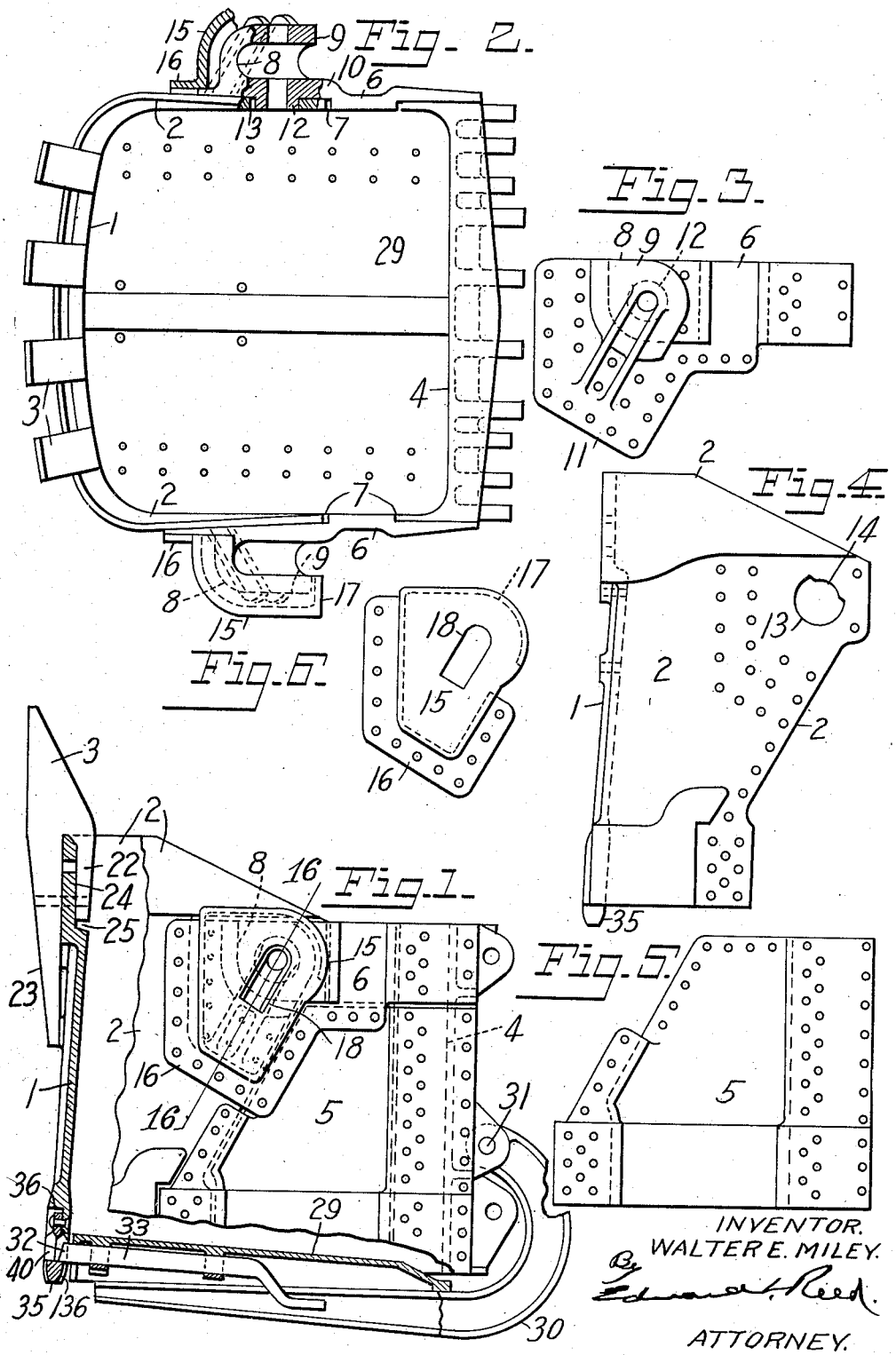
INVENTOR.
WALTER E. MILEY.
By Edward Reed
ATTORNEY.

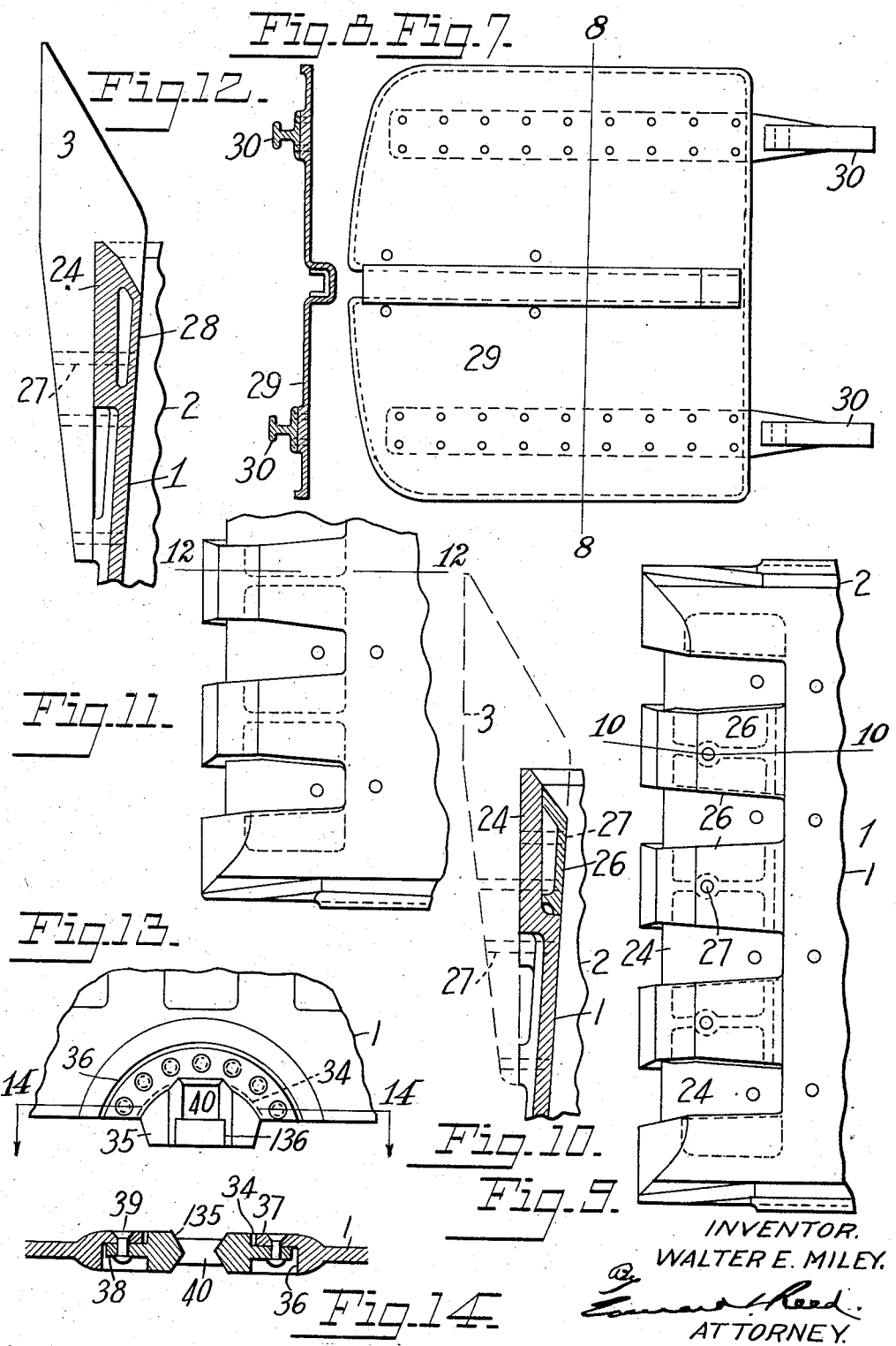

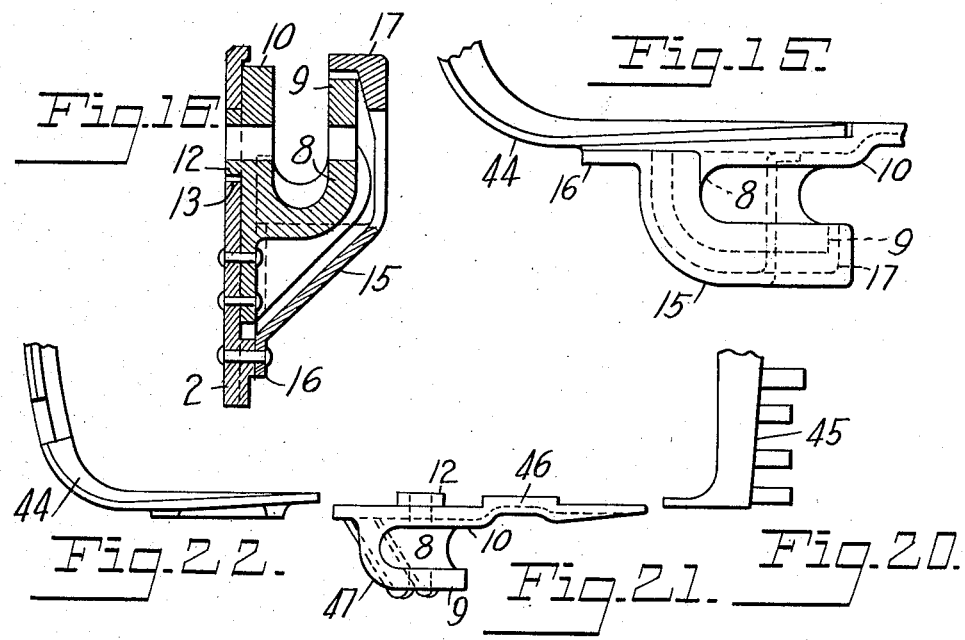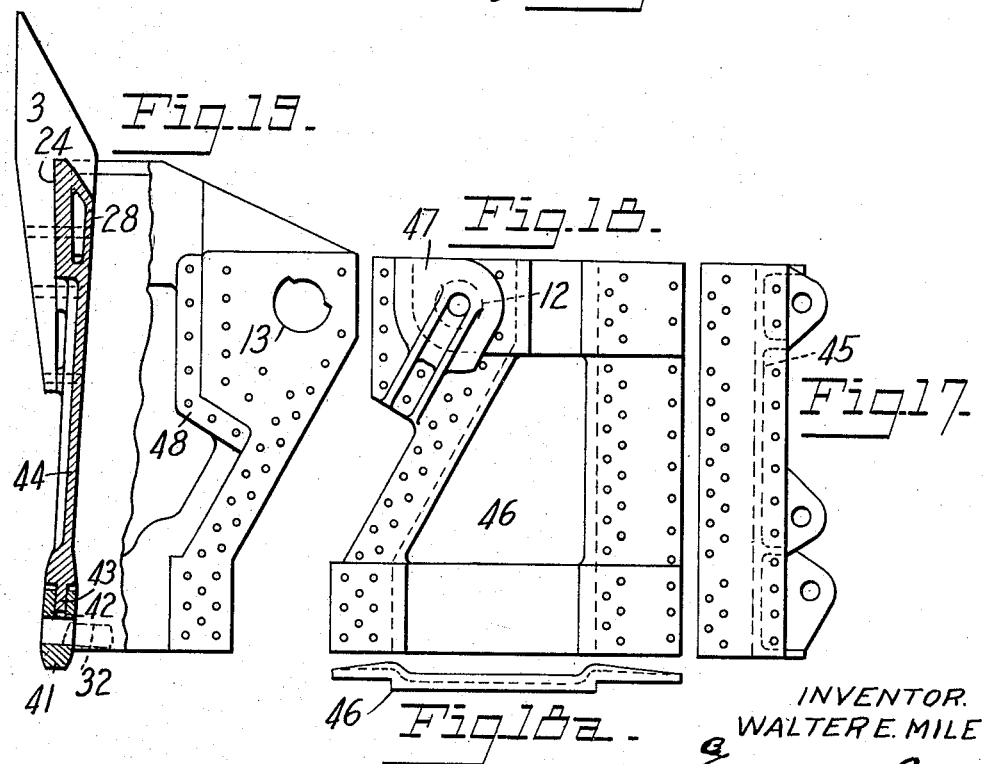

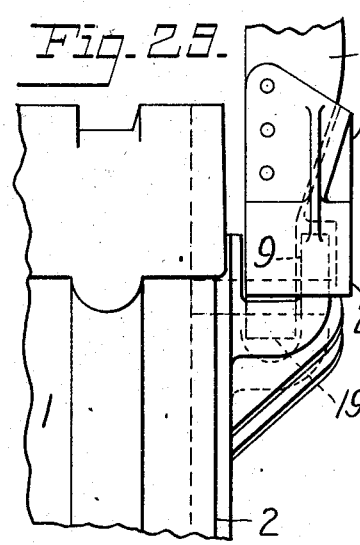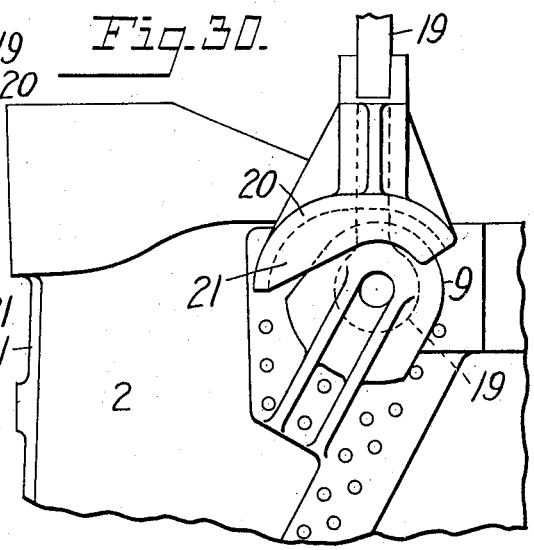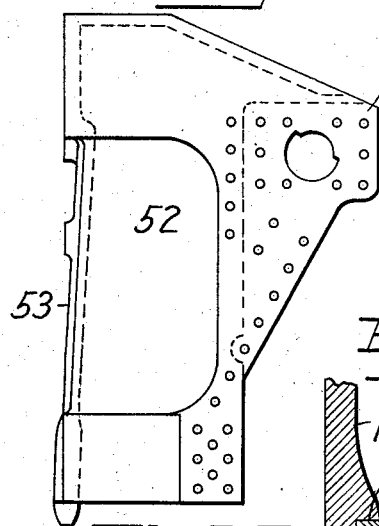

Patented Feb. 4, 1930

1,745,436

UNITED STATES PATENT OFFICE

WALTER E. MILEY, OF MARION, OHIO, ASSIGNOR TO THE MARION STEAM SHOVEL COMPANY, OF MARION, OHIO, A CORPORATION OF OHIO

EXCAVATING DIPPER

Application filed February 21, 1927. Serial No. 169,786.

This invention relates to excavating dippers of the type commonly employed in connection with power operated shovels.

One object of the invention is to provide a dipper made up of a plurality of parts or sections which will be simple in its construction and of a very strong durable character; and which will be of such a character that it may be made either entirely of cast metal parts or of a combination of cast metal parts and plates.

Another object of the invention is to provide such a dipper with a bail bracket of a strong durable character in which the openings for the bail pins will be maintained permanently in alinement; and in which the bail brackets will be so connected with the dipper front as to cause the lifting strains to be imposed on the front.

Another object of the invention is to provide such a dipper with means for protecting the bail brackets from injury or wear due to contact with the material in which the dipper is working.

Another object of the invention is to provide such a dipper in which the door latching means will be of such a character and so arranged that the latch plate will not be exposed to excessive wear or be liable to be broken; and in which the latch plate will be reversible.

Another object of the invention is to provide such a dipper in which the inner surface of the dipper front will be free from obstructions which would interfere with the free movement of the material through the dipper.

Other objects of the invention will appear as the device is described in detail.

In the accompanying drawings Fig. 1 is a side elevation, partly in section, showing a dipper embodying my invention; Fig. 2 is a plan view of such a dipper, partly broken away; Fig. 3 is a detail view of the top bar; Fig. 4 is a side elevation of the dipper front; Fig. 5 is a side elevation of the lower portion of the side member; Fig. 6 is a side elevation of the protector for the bail bracket; Fig. 7 is a top plan view of the door; Fig. 8 is a section taken on the line 8—8 of Fig. 7; Fig. 9 is a rear elevation of the upper portion of the dipper front with the teeth removed; Fig. 10 is a vertical sectional view taken on the line 10—10 of Fig. 9; Fig. 11 is a rear elevation of a portion of the upper end of the dipper front showing a slightly modified construction; Fig. 12 is a section taken on the line 12—12 of Fig. 11; Fig. 13 is a front elevation of the lower portion of the dipper front showing the latch plate; Fig. 14 is a section taken on the line 14—14 of Fig. 13; Fig. 15 is a top plan view of one of the bail brackets and its protector; Fig. 16 is a vertical sectional view taken through the bail bracket and protector; Figs. 17, 18, 18A and 19, show a slightly modified form of the dipper, Fig. 17 being an edge view of the dipper back; Fig. 18 being a side elevation of the one-piece side member, Fig. 18A being a bottom plan view of the same, and Fig. 19 being a side elevation, partly in section, of the dipper front; Fig. 20 is a plan view of a portion of the dipper back; Fig. 21 is a plan view of the side member; Fig. 22 is a plan view of a portion of the front; Fig. 23 is a side elevation of one of the side members of another modified form of the dipper; Fig. 24 is a side elevation of one of the bail brackets; Fig. 25 is a side elevation of the dipper front; Fig. 26 is a plan view of the side member of Fig. 23; Fig. 27 is a plan view of the separate bail bracket of Fig. 24; Fig. 28 is a plan view of a portion of the front of Fig. 25; Fig. 29 is a front elevation of a portion of the dipper showing a modified form of protector for the bail bracket; Fig. 30 is a side elevation of the device shown in Fig. 29; and Fig. 31 is a detail view showing a modified arrangement of the latch plate.

In these drawings I have illustrated one embodiment of my invention together with certain modifications thereof. The several parts of the dipper are of such a character that the dipper may be made entirely of cast metal parts or may be made partly of cast metal parts and partly of plates, the construction being such that either material may be used without change of design. The modifications consist for the most part of such changes as are necessary to enable the side members to be made in one or more parts with the bail brackets integral with or separate from the side members. It will be understood that the embodiment here shown has been chosen for the purposes of illustration only and that the various modifications are merely typical of changes which may be made without departing from the spirit of the invention.

As a matter of convenience in the description the terms "upper" and "lower," as used in connection with the dipper, have reference to the dipper in the position shown in Fig. 1, in which the dipper front is in a vertical position.

Having reference more particularly to Figs. 1 to 5 the dipper comprises a front 1, which is slightly curved in shape and is provided with rearwardly extending side portions 2, and mounted at the upper or cutting edge of the front are the usual teeth 3. Inasmuch as this front is subjected to very severe wear it is usually made of cast metal, manganese steel being preferable for this purpose. The dipper back is shown at 4 and carries the usual lugs for connecting the same with the dipper arm and for pivotally supporting the door as will hereinafter appear. Because of the strains imposed thereon the back also is usually a casting. The front and the back are connected one to the other by side members which may be either castings or plates and which, further, may be formed in one part or in more parts. As shown in Fig. 1 the side member comprises a lower portion 5 and an upper portion or top bar 6. The side member as a whole overlaps and is rigidly secured to the back 4, preferably by means of rivets, and the forward portions of the side members overlap the respective side portions of the front and are rigidly secured thereto by rivets or the like. The front and rear portions of the side members are recessed on their inner sides, as shown at 7, to cause the connected portions of the back and the front to lie substantially flush with the inner surfaces of the side members. Arranged on the respective sides of the dipper are bail brackets 8 to receive the arms of the bail by means of which the dipper is elevated. As here shown, each bail bracket comprises an outer portion 9 and an inner portion 10 formed in one piece with the outer portion so that the openings to receive the bail pin may be properly alined one with the other and will remain permanently in their properly alined positions. Usually the outer portion of the bail bracket is separate from the inner portion thereof and the inner portion thereof comprises a part of the side member or front of the dipper to which the outer portion of the bracket must be riveted. As a result it is very difficult to obtain the proper alinement of the pin opening in the bracket with the pin opening in that part of the dipper to which the bracket is riveted. Moreover, due to the severe service to which these dippers are subjected the outer portion of the bracket will frequently become loose, thus causing breakage and delay. By providing a complete bracket consisting of inner and outer portions formed in one piece the pin openings may be very easily alined when the bracket is made and there is no possibility of their getting out of alinement. I also prefer that the bail bracket as a whole should be formed in one piece with the adjacent part of the dipper and, as shown in Figs 2 and 3, the bail bracket is cast integral with the top bar 6 of the adjacent side member of the dipper. As here shown, the top bar has at its forward end a downwardly extending portion, or enlarged portion, 11, and the bail bracket is cast integral with this part of the bar. That part of the bar by which the bail bracket is carried overlaps the rearwardly extending side portion 2 of the front and is rigidly secured thereto by rivets. However, it is desirable that the bail brackets be so connected with the dipper front that the severe strains imposed thereon will be transmitted from the brackets directly to the front, and the rivets connecting these parts will not be subjected to shearing strains. For this purpose the bail bracket and the adjacent portion of the front are provided with interlocking parts so arranged that the thrust on the one part will be transmitted directly to the other. As here shown, the inner portion of the bail bracket is provided with an inwardly extending lug which is preferably in the form of a boss 12 cast integral therewith and which, when the parts are in their assembled position, extends through an opening 13 in the rearwardly extending part of the front, this opening having a bearing surface 14 with which the lug or boss 12 contacts.

The bail brackets necessarily project from the sides of the dipper and the arrangement is such that they come in contact with the material in which the dipper is working and are subjected to very severe wear and are liable to breakage. To protect the bail brackets from this severe wear I have arranged on each side of the dipper, in advance of the bail brackets, a guard 15, (see Figs. 6, 15 and 16). This guard may take various forms but, as here shown, it comprises a body portion or plate overlying the outer side of the bail bracket and having at its forward and lower edges a flange 16 which lies below and in front of the bail bracket and is rigidly secured to the side of the dipper. The guard is preferably provided at its upper edge with a forwardly extending flange 17 which overlies the upper and rear edges of the outer portion 9 of the bracket. The rear portion of the guard is spaced from the adjacent side member of the dipper so as to provide an opening at the rear of the bracket to receive the bail when the dipper front approaches a horizontal position, and through which may escape any material which may enter the guard. The guard is also provided with an opening, such as a slot 18, arranged in line with the pin openings of the bracket so that the bail pin may be removed without removing the guard.

As has been stated, this guard may take various forms and in Figs. 29 and 30 I have shown a guard which is mounted on the bail 19 and is so arranged with relation to the bail bracket that it will lie in front of that bracket. As here shown, the guard comprises a curved body 20 which is rigidly secured to the bail above the bracket and is provided with a depending flange 21 which overlies the upper portion of the bracket. The body portion of the guard extends for some distance in front of the bail and the guard as a whole is so arranged that it will lie in advance of and overlap the guard in all operative positions of the bail and the dipper.

The teeth 3 are usually bifurcated to receive the upper or cutting edge of the dipper front and the inner portion 22 of each tooth extends into the dipper and the outer portion 23 thereof extends downwardly along the outer surface of the front. In the ordinary construction the inner portions 22 of the teeth rest upon the inner surface of the front and therefore project inwardly such a distance as to provide substantial obstructions to the passage of the material through the dipper, these obstructions being particularly objectionable when the dipper is working in material which has a tendency to wedge or pack between the teeth. In order to provide the dipper front with a substantially smooth inner surface free from obstructions I have offset the upper portion of the dipper front, as shown at 24, to provide the inner surface of the front with a recess 25 extending across the upper end thereof. The inner portions 22 of the dipper teeth extend into this recess and the recess is of a depth approximately equal to the thickness of the portions 22 of the teeth so that the inner surfaces of these teeth are arranged in substantially the same plane with the inner surface of the front. Because of the offset position of the upper portion of the front the outer portions of the teeth extend a greater distance from the front than they otherwise would do and thus provide, in the bank in which the dipper is working, a deeper path or increased clearance for the latch plate at the lower end of the front, as will hereinafter appear. The spaces between the inner portions 22 of the dipper teeth are preferably closed by fillers which fit snugly between the teeth and which are of such thickness that their inner surfaces are in substantially the same plane with the inner surfaces of the teeth and of the front and the forward portions of the fillers are beveled toward the cutting edge of the front. These fillers may be of any suitable character and in Figs. 9 and 10 they are shown at 26 as formed separate from the front and rigidly secured thereto by rivets 27. In Figs. 11 and 12 the fillers are shown at 28 as formed integral with the dipper front. These fillers are of the same general shape and arrangement as those shown in Figs. 9 and 10 but instead of being separately formed and subsequently attached to the front they are cast in one piece with the front, thus providing the front with a series of recesses, between adjacent fillers, to receive the teeth.

The dipper is provided at its lower end with a door 29 which, in the present construction, is carried by arms 30, the rear ends of which are curved upwardly and pivotally mounted on the dipper back at 31, the arrangement being such that the door will have swinging movement into and out of a position to close the lower end of the dipper. The door is provided with a latch bar 32 adapted to engage a latch plate on the dipper front to hold the door in its closed position. In the usual dipper construction this latch bar is mounted on the outer surface of the door and when the door is in its closed position the bar will lie a considerable distance below the lower edge of the dipper front. As a result the latch plate must extend a corresponding distance below the front and is thus carried in such a position that it will engage material in which the dipper is working and will be subjected to very severe wear and frequent breakage. In the present construction the door is provided in its outer surface with a recess or channel 33 extending lengthwise thereof, that is, from the front toward the rear, and of such depth that the latch bar will lie partially or entirely above the plane of the door and when the door is in its closed position the forward end of the latch bar will lie adjacent to or above the lower edge of the dipper front, thus permitting the latch plate to be so arranged that the latch receiving opening therein will be adjacent to or above the lower edge of the front and the latch plate will project but a short distance, if any, below the front. Because of this arrangement the latch plate has less contact with the material in which the dipper is working and is therefore subjected to much less severe wear and is less likely to be broken. In the present dipper, the arrangement of the teeth is such that the path formed through the bank of material will be of sufficient depth to provide clear passage for the latch plate and there will be very little contact between the latch plate and the material. Preferably the channel or recess 33 is formed in the door by pressing upwardly an intermediate portion thereof and, if desired, the inner surface of this channel or recess may be inclined so that the forward end of the latch bar will be in a higher position with relation to the door than the rear end thereof. The operating mechanism of the latch bar may be of the usual or any suitable character and is not here shown.

In order that the latch plate may be attached to the front with its inner surface substantially flush with the inner surface of the front, and may be mounted in an elevated position with relation to the front and very firmly secured thereto the lower edge of the front has formed therein a recess 34, which may extend entirely through the front. The latch plate, 35, is shaped to fit snugly within this recess and the latch plate and the walls of the recess are provided with interlocking parts to hold the plate rigidly against displacement with relation to the front. In the present construction, the recess is curved so that it is substantially semi-circular in shape and has formed therein a groove 36, one wall of which is in the form of a flange 37 extending entirely about the edge of the recess. The latch plate has a projecting portion or rib 38 which extends into the groove 36 so as to overlap the flange 37, to which it is rigidly secured by suitable fastening devices, such as rivets 39. The inner heads of the rivets are preferably countersunk so that they will not project into the dipper, but the present arrangement of the connecting parts makes it possible to permit the outer heads of the rivets to project beyond the face of the rib 38 without extending beyond the outer surface of the front. Thus these outer rivet heads are easily accessible and can be readily severed when it is desired to remove the latch plate. The latch plate has formed therein a latch receiving opening 40 which, in the arrangement illustrated in Figs. 1, 13 and 14, has its lower edge substantially in line with the lower edge of the front so that the opening lies above the lower edge of the front and in line with the forward end of the recess 23 in the door when the latter is in its closed position. The arrangement of the interlocking parts of the front and the latch plate is such that the latch plate may be mounted in the recess with either side thereof facing inwardly, thus enabling the plate to be reversed when one side becomes worn. In the present instance, the rib 38 is arranged substantially midway between the inner and outer surfaces of the latch plate and consequently the plate will occupy substantially the same position when mounted in the recess with either side inward. It will be obvious that the character of the recess and of the interlocking connection between the latch plate and the front may take various forms and in Fig. 19 I have shown the latch plate 41 as having in its inner or curved edge a central groove 42 into which extends a rib 43 carried by the front and extending about the edge of the recess.

The ordinary latch plate for dippers has the latch receiving opening of substantially uniform diameter throughout its length. In the operation of the dipper this opening will pick up more or less dirt which is packed into the outer end of the opening against the latch bar. When the latch bar is again inserted in the opening, upon the closing of the door, it will contact with this dirt and further pack the same, with the result that the dirt becomes so firmly packed in the opening that it is very difficult to remove and it gradually fills up the opening until there is no longer sufficient room for the latch bar to enter and engage the edge of the plate. To overcome this objectionable feature I have so shaped the opening in the present latch plate that it flares outwardly. In the present instance, two or more of the walls of the opening are beveled or tapered inwardly, as shown at 135, to cause the opening to flare from its center toward both ends, thus providing an outwardly flared opening when the latch plate is attached to the front with either side outward. As a result of this flared shape of the opening the dirt which enters the opening will be easily dislodged by the impact of the latch bar against the same as the latter enters the opening and will be prevented from packing tightly within the opening and from so filling the opening as to prevent the proper entrance of the latch bar. It will be obvious that this particular shape of the opening may be utilized in latch plates of various kinds whether they be mounted in the manner here shown or in the usual manner. Further, in order to reduce the amount of dirt that will be picked up by the latch plate I have cut away or relieved the plate immediately below the opening, thus the lower edge of the opening will not come in contact with the bank or scrape up the dirt to the same extent that it would if not so relieved. In the present instance, the latch plate itself is relieved, as shown at 136. However, in Fig. 31 I have shown a modified arrangement of the latch plate in which the dipper front has a part lying in front of the lower portion of the latch plate. As there shown, the dipper front has a recess 137 in its inner face which does not extend completely through the front but is of sufficient depth to receive the latch plate 138. The latch receiving opening 139 of the latch plate has its walls flared as above described and that portion of the front which overlies the latch plate has an opening 140 in line with the opening in the plate, the walls of this opening also being flared. The front is relieved beneath the opening 140, as shown at 141, so that the edge of the opening 140, which in effect forms a continuation of the opening 139, will not scrape up the dirt.

The several major parts of the dipper may take various forms, this being particularly true with relation to the side members, each of which may consist of a single part or of a plurality of parts and which may have the bail brackets formed either in one piece therewith or separate therefrom and rigidly secured thereto. In Figs. 17 to 22 I have shown a second form of the dipper in which the front 44 and the back 45 are of substantially the same construction as shown in Figs. 1 and 2 but the side member 46 is formed of a single part, it being either made from a single piece or fabricated from plates or sheets. The general shape and arrangement of the parts is substantially the same as that of the side member shown in Fig. 1 with the exception that the top bar is integral with the lower portion of the side member. Bail brackets 47 have their inner and outer portions formed in one piece with each other and in one piece with the side member 46. The inner portion of the bail bracket has a lug or boss 12 arranged to enter the opening 13 in the adjacent side portion of the front. In these drawings the guard for the bail bracket is not shown but the front is provided with a seat or pad 48 on which the guard may be mounted.

In that arrangement of the dipper parts shown in Figs. 23 to 28 the side member 50 is in one piece, it being here shown as fabricated from plates and bars, and it has at its upper end a forwardly extending part 51 adapted to extend on the inner side of the rearwardly extending side portion 52 of the front 53. The bail bracket 54 is in this instance formed separate from the other parts of the dipper and is mounted on the side portion of the front and on the side member, the bail bracket, front and side member being rigidly connected one to the other by rivets. The inner and outer portions of this bail bracket are formed in a single piece and the inner portion has a stud or boss 12 to enter the opening 13 in the side portion of the front. The part 51 of the side member has an opening 55 in line with the pin openings 56 of the bail bracket to facilitate the removal of the pin.

While I have shown and described one embodiment of my invention with certain modifications thereof I wish it to be understood that I do not desire to be limited to the details thereof as various modifications may occur to a person skilled in the art.

Having now fully described my invention, what I claim as new and desire to secure by Letters Patent, is:

1. In an excavating dipper, a dipper front having a recess in the lower edge thereof, a latch plate mounted in said recess and having a latch receiving opening extending above the lower edge of said front.

2. In an excavating dipper, a dipper front having a recess in the lower edge thereof, and a latch plate in said recess, said latch plate and the wall of said recess having interlocking parts to retain said plate in said recess.

3. In an excavating dipper, a dipper front having a recess in the lower edge thereof, and a latch plate in said recess, said latch plate and the wall of said recess having interlocking parts to retain said plate in said recess, said parts being so arranged that said latch plate may be mounted in said recess with either side adjacent to the inner surface of said front.

4. In an excavating dipper, a dipper front having a recess in the lower edge thereof, and a latch plate mounted in said recess, one of said parts having a groove extending along the edge thereof and the other of said parts having a rib to enter said groove, and means for retaining said rib in said groove.

5. In an excavating dipper, a front having an approximately semi-circular recess in the lower edge thereof, the curved wall of said recess having a longitudinal groove therein, a latch plate shaped to fit in said recess and having a rib to extend into said groove, and means for securing said rib in said groove.

6. In an excavating dipper, a dipper front having a recess in the lower edge thereof, and a latch plate mounted in said recess and having a latch engaging part adjacent to the lower edge of said front.

7. In an excavating dipper, a front having a recess in the lower edge thereof, and a flange arranged along the edge of said recess, and a latch plate shaped to fit within said recess and having a part to overlap said flange, and means for securing said part to said flange.

8. In an excavating dipper, a door movable into and out of a position to close the lower end of said dipper, said door having a recess in the outer surface thereof, a latch bar mounted in said recess, said recess being of such a depth that said latch bar may be supported therein with its forward end above the forward edge of said door, and a latch plate carried by a wall of said dipper for engagement by said latch bar.

9. In an excavating dipper, a door movable into and out of a position to close the lower end of said dipper, said door having a recess in the lower surface thereof, the forward end of said recess being arranged above the forward edge of said door, a latch bar slidably mounted in said recess, and a part carried by said dipper and having an opening to receive said latch bar.

10. In an excavating dipper, a front, a door movable into and out of a position to close the lower end of said dipper, said door having a longitudinal channel in the outer surface thereof, the forward end of said channel extending above the forward edge of said door and being arranged to extend above the lower edge of said front when said door is in its closed position, and a latch bar mounted in said channel, said front having a part to be engaged by said latch bar.

11. In an excavating dipper, a front having a recess extending through the lower portion thereof, a latch plate mounted in said recess and having a latch receiving opening extending above the lower edge of said front, a door movable into and out of a position to close the lower end of said dipper and having a longitudinal recess in the outer surface thereof, the forward end of which extends above the forward edge of said door and will be in line with the opening in said latch plate when said door is in its closed position, and a latch bar mounted in said recess.

12. In an excavating dipper, a front having a recess in the lower portion thereof, a latch plate mounted in said recess and having a latch receiving opening arranged above the lower edge of said front, a door movable into and out of a position to close the lower end of said dipper and having an inclined recess extending lengthwise thereof, said recess having its greatest depth at its forward end and having said forward end extended above the adjacent edge of said door and in line with the opening in said latch plate when said door is in its closed position, and a latch bar mounted in said recess.

13. In an excavating dipper, a front, a latch plate attached to the lower portion of said front and having a latch receiving opening, said opening having two or more of its walls flared toward the outer surface of said front.

14. In an excavating dipper, a front, a latch plate attached to the lower portion of said front and having a latch receiving opening, said opening being flared from an intermediate point toward its inner and outer surfaces.

15. A latch plate for an excavating dipper or the like having a latch receiving opening which has two or more of the walls flared toward one side thereof.

16. In an excavating dipper, a front having a recess in the lower portion thereof and having a flange extending into said recess about the edge thereof, a latch plate arranged within said recess and having a part overlapping said flange, the outer surface of said part of said latch plate being spaced from the outer surface of said front to form a channel, and rivets for securing said part of said latch plate to said flange, the heads of said rivets being arranged within said channel.

17. In an excavating dipper, a front having a recess in the lower portion thereof, a latch plate mounted in said recess and having a latch receiving opening and having its inner surface arranged substantially flush with the adjacent portion of the inner surface of said front.

18. In an excavating dipper, a front and a latch plate secured to the lower portion of said front and having a latch receiving opening, one of said parts being cut away below the latch opening to prevent the lower edge of the opening from contacting with the bank.

19. In an excavating dipper, a front and a latch plate secured to the lower edge of said front and having a latch receiving opening, said latch plate having its outer surface relieved below said opening.

20. In an excavating dipper, a door movable into and out of a position to close the lower end of said dipper, said door having a longitudinal channel in the outer surface thereof, a guideway arranged within said channel, a latch bar mounted in said guideway, and a latch plate carried by a fixed wall of said dipper and having the latch bar receiving opening arranged above the lower edge of said wall and in line with said channel when said door is in its closed position.

21. In an excavating dipper comprising a dipper front and a door movable into and out of a position to close the lower end of the dipper, a latch plate carried by said dipper front and having an opening extending above the lower edge of said front, and a latch bar movably mounted on said door and arranged to enter said opening in said latch plate when said door is in its closed position.

In testimony whereof, I affix my signature hereto.

WALTER E. MILEY.